(12) United States Patent
Choi

(10) Patent No.: US 11,816,554 B2
(45) Date of Patent: Nov. 14, 2023

(54) METHOD AND APPARATUS FOR GENERATING WEATHER DATA BASED ON MACHINE LEARNING

(71) Applicant: SI Analytics Co., Ltd., Daejeon (KR)

(72) Inventor: Yeji Choi, Daejeon (KR)

(73) Assignee: SI ANALYTICS CO., LTD., Daejeon (KR)

( * ) Notice: Subject to any disclaimer, the term of this patent is extended or adjusted under 35 U.S.C. 154(b) by 0 days.

(21) Appl. No.: 18/012,297

(22) PCT Filed: Jun. 15, 2021

(86) PCT No.: PCT/KR2021/007447
§ 371 (c)(1),
(2) Date: Dec. 22, 2022

(87) PCT Pub. No.: WO2021/261825
PCT Pub. Date: Dec. 30, 2021

(65) Prior Publication Data
US 2023/0267303 A1 Aug. 24, 2023

(30) Foreign Application Priority Data
Jun. 25, 2020 (KR) ........................ 10-2020-0078029

(51) Int. Cl.
*G01W 1/00* (2006.01)
*G06N 3/044* (2023.01)
(52) U.S. Cl.
CPC .............. *G06N 3/044* (2023.01); *G01W 1/00* (2013.01)

(58) Field of Classification Search
CPC ....................................................... G01W 1/00
See application file for complete search history.

(56) References Cited

U.S. PATENT DOCUMENTS 10,969,519 B2   4/2021   Girier et al.

FOREIGN PATENT DOCUMENTS

| JP | 2000258556 A | 9/2000 |
|----|---|---|
| JP | 6486876 B2 | 3/2019 |
| JP | 2020091171 A | 6/2020 |
| KR | 1020190057013 A | 5/2019 |
| KR | 102043999 B1 | 11/2019 |

(Continued)

OTHER PUBLICATIONS

Xiao et al. "An Ensemble Machine-Learning Model to Predict Historical PM2.5 Concentrations in China from Satellite Data", EST, 2018, pp. 13260-13269.*

(Continued)

*Primary Examiner* — Li Wu Chang
(74) *Attorney, Agent, or Firm* — Umberg Zipser LLP

(57) ABSTRACT

Disclosed is a computing device for generating weather observation data for solving the problem. The computing device includes: a memory including computer executable components; and a processor executing following computer executable components stored in the memory, and the computer executable components may include an initial ground weather observation data recognition component recognizing observed initial ground weather observation data, and a weather data generation component trained to generate weather data of a gap region on the initial ground weather observation data by using a machine learning module.

16 Claims, 7 Drawing Sheets

(56) References Cited

FOREIGN PATENT DOCUMENTS

| | | | |
|---|---|---|---|
| KR | 1020200009657 A | 1/2020 | |
| KR | 102063358 B1 | 3/2020 | |
| KR | 1020200052806 A | 5/2020 | |
| KR | 102175179 B1 | 11/2020 | |
| WO | WO-2004006041 A2 * | 1/2004 | ............. G16H 50/20 |

OTHER PUBLICATIONS

Lin et al. "Data-driven missing data imputation in cluster monitoring system based on deep neural network", 2019, pp. 860-877, file:///C:/Users/Ichang/Downloads/Data-driven_missing_data_imputation_in_cluster_mon.pdf.*

Apr. 24, 2020, pp. 1-187 (Miraevision Group. A Study on Policy for the Fourth Industrial Revolution Response of KMA Data's Integration Services. Korea Meteorological Administration.), 187 pages.

PCT International Search Report and Written Opinion, International Application No. PCT/KR2021/007447, International filing date Jun. 15, 2021, 8 pages.

Yeh et al., "Semantic Image Inpainting with Deep Generative Models," Jul. 13, 2017, 19 pages.

Korea Patent Office, Office Action, dated Aug. 31, 2021.

Korea Patent Office; Notice of Allowance; International Application No. KR 10-2020-0078029; dated Dec. 29, 2021; 7 pages.

Policy Research for Korea Meteorological Administration Data Integration Service in Response to the 4th Industrial Revolution (Dec. 2019).

* cited by examiner

[Figure 1]
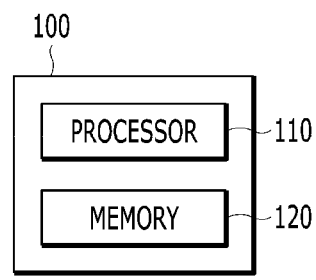

【Figure 2】
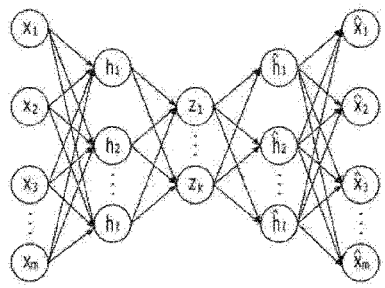

【Figure 3】
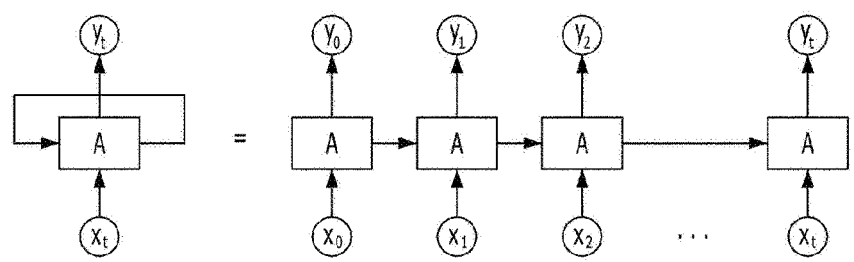

【Figure 4】
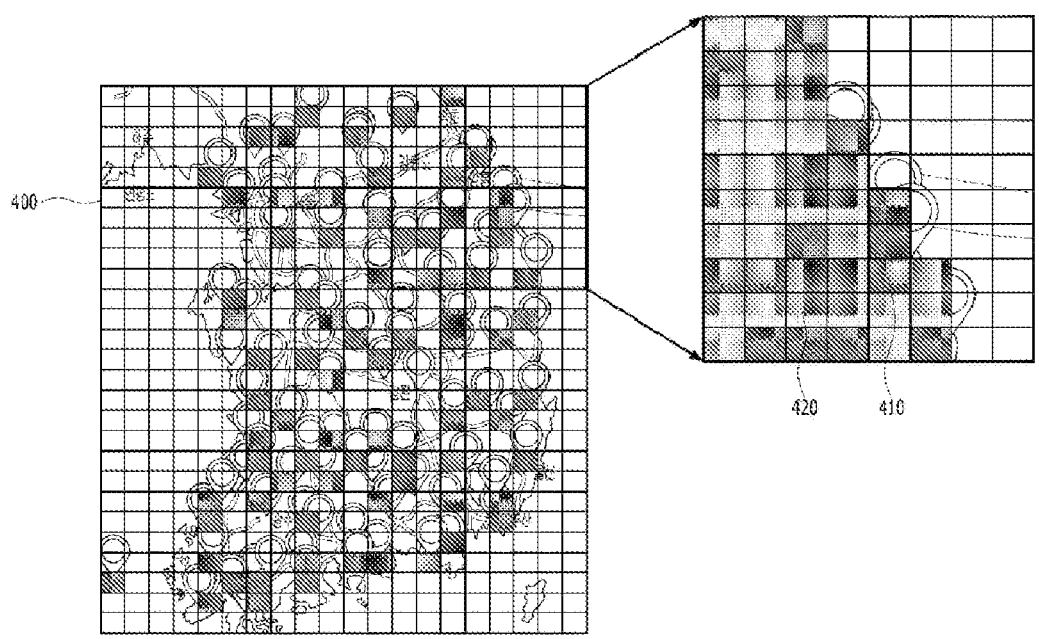

[Figure 5]
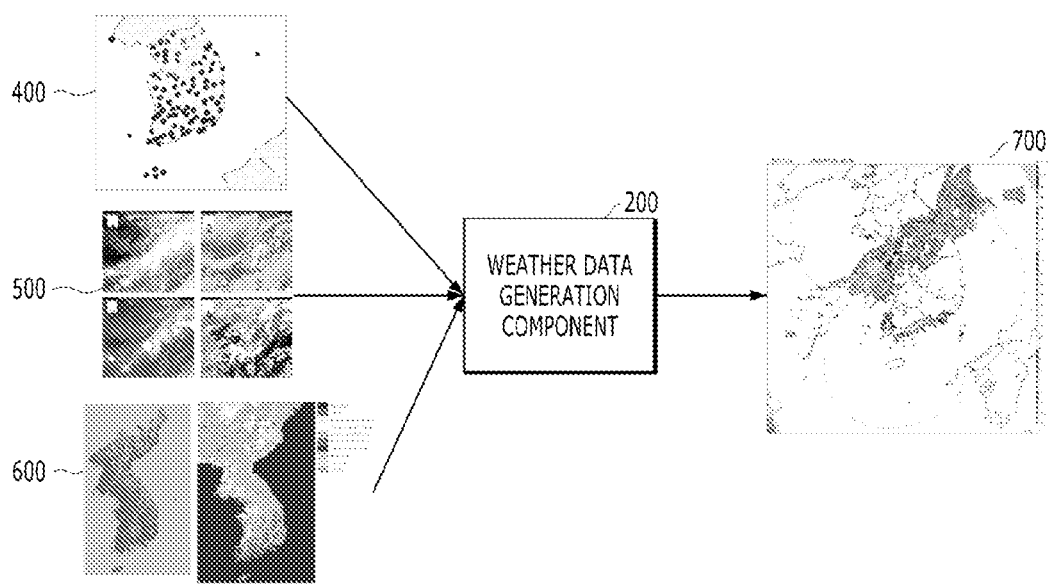

【Figure 6】
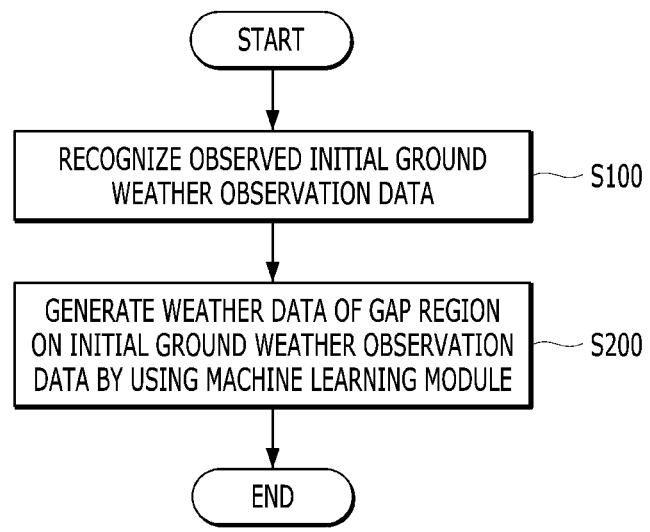

【Figure 7】
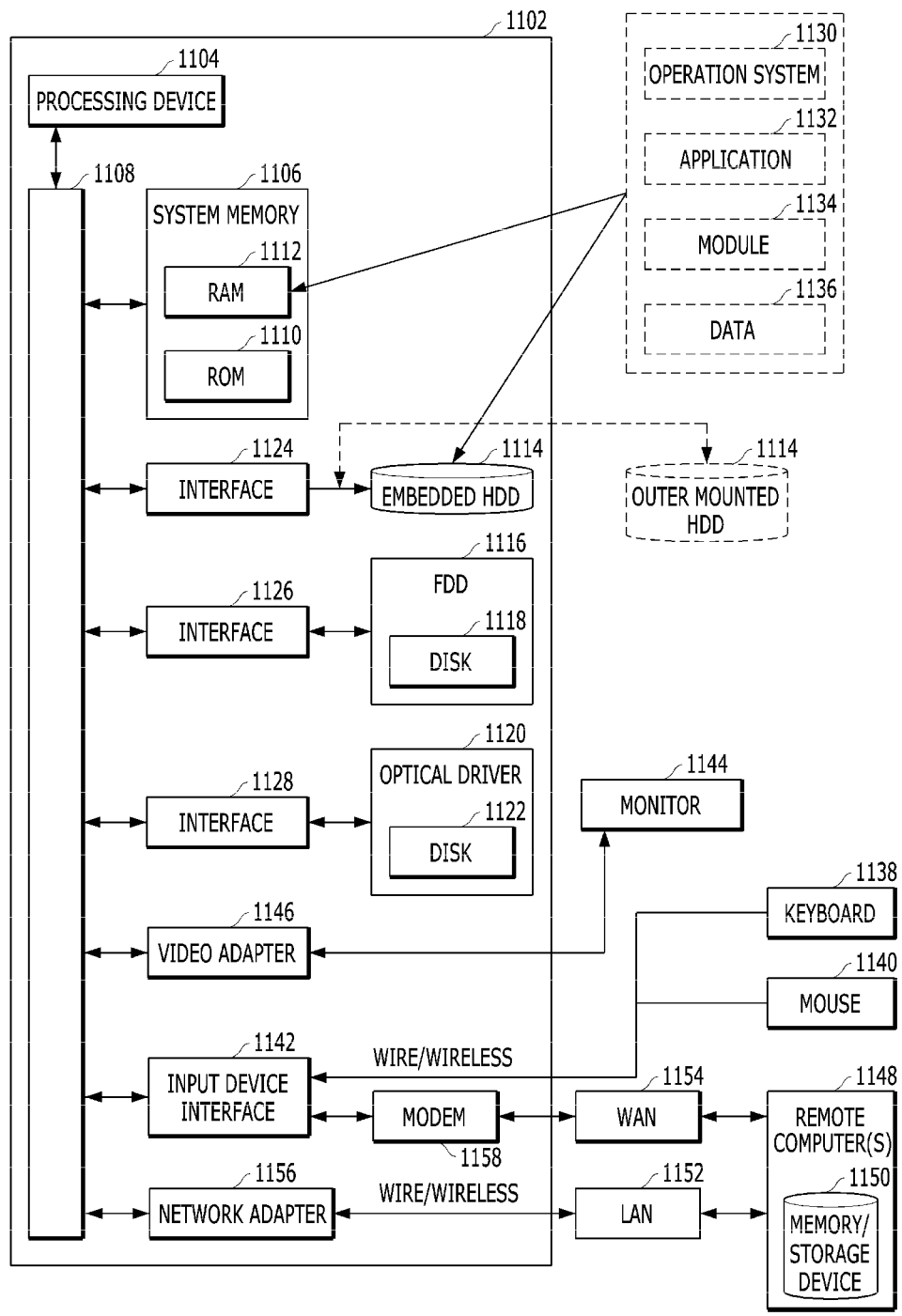

METHOD AND APPARATUS FOR GENERATING WEATHER DATA BASED ON MACHINE LEARNING

TECHNICAL FIELD

The present disclosure relates to a method for generating weather data, and more particularly, to a computing device for generating weather data for an observation gap region based on machine learning.

BACKGROUND ART

Currently, ground observations used to observe meteorological factors include Automatic Weather System (AWS) and automated synoptic observing system (ASOS). The Automatic Weather System (AWS) is managed by the Korea Meteorological Administration at 510 points, and observes a temperature, a precipitation, a wind, a humidity, and an atmospheric pressure, and the automated synoptic observing system (ASOS) observes solar radiation, sunshine, clouds, visibility, ground conditions, etc., in addition to weather factors observed by the AWS at 102 points.

The Korea Meteorological Administration is trying to obtain high-resolution ground-observation meteorological factor values by continuously increasing the weather observation network, but it is not possible to install observation instrument at all points, and since most weather observations are concentrated in the urban area, there is a limit that observation gaps depend only on observation instrument. Further, missing (a phenomenon in which observed values are lost) may occur in a part of the observation area of the observation instrument. Therefore, there may be a demand for a technique for producing weather factor values for gap regions based on deep learning techniques using satellite observation values and topographical information values capable of obtaining data on observation gap regions.

DISCLOSURE

Technical Problem

The present disclosure has been made in an effort to provide an apparatus and a method for generating weather data for an observed gap region.

Technical Solution

An exemplary embodiment of the present disclosure provides a computing device for generating weather observation data for solving the problem. The computing device may include: a memory including computer executable components; and a processor executing following computer executable components stored in the memory, and the computer executable components may include an initial ground weather observation data recognition component recognizing observed initial ground weather observation data, and a weather data generation component trained to generate weather data of a gap region on the initial ground weather observation data by using a machine learning module.

The weather data generation component may be a neural network trained to reconfigure a missing region of observation data based on machine learning.

The weather data generation component may be trained based on non-missing ground weather observation data and artificial missing ground observation data generated by using the non-missing ground weather observation data, and the non-missing ground weather observation data may be generated by using at least one of the initial ground weather observation data, land surface characteristic data, land surface type data, or satellite weather observation data.

The non-missing ground weather observation data may be generated based on at least a part of a region in which the observation data is present among the initial ground weather observation data.

The non-missing ground weather observation data may be generated by applying the observation data of the satellite weather observation data to a observation data missing region of the initial ground weather observation data.

The non-missing ground weather observation data may be generated by applying missing region weather estimation data generated by using relational data describing at least one of the relationship between the satellite weather observation data for the missing region, or the land surface characteristic data, or land surface type data.

The non-missing ground weather observation data may be generated by using an observation error of the initial ground weather observation data.

The non-missing ground weather observation data may be generated by modeling a distribution of the initial ground weather observation data within the observation error.

The initial ground weather observation data may be a Gaussian distribution.

At least two non-missing ground weather observation data may be generated for each of the initial ground weather observation data.

The computer executable components may further include a non-missing ground weather observation data generation component, and the non-missing ground weather observation data generation component may generate one or more non-missing ground weather observation data by using a machine learned based generative model.

The non-missing ground weather observation data generation component may use one or more first-time non-missing ground weather observation data for generating second-time missing ground observation data.

The non-missing ground weather observation data generation component may be a recurrent neural network (RNN) based machine learning model.

The weather data generation component may use at least one of the initial ground weather observation data, satellite weather observation data, land surface characteristic data, or land surface type data.

The weather data generation component may generate weather data considering land surface characteristics or a land surface type by receiving at least one of the land surface characteristic data or the land surface type data as metadata for the initial ground weather observation data as an input.

The computer executable components may further include a weather data high-resolution production component performing a high-resolution production task for the weather data generated by the weather data generation component.

Another exemplary embodiment of the present disclosure provides a method for generating weather observation data by a computing device. The method may include: recognizing observed initial ground weather observation data; and generating weather data of a gap region on the initial ground weather observation data by using a machine learning module.

Still another exemplary embodiment of the present disclosure provides a computer program storing computer readable storage medium. The computer program may include instructions for causing one or more processors to generate weather observation data, and the instruction may include: recognizing observed initial ground weather observation data; and generating weather data of a gap region on the initial ground weather observation data by using a machine learning module.

Advantageous Effects

According to an exemplary embodiment of the present disclosure, weather data for an observation gap region can be provided.

DESCRIPTION OF DRAWINGS

FIG. 1 is a block diagram of a computing device for generating weather data according to an exemplary embodiment of the present disclosure.

FIG. 2 is a schematic diagram illustrating a network function according to an exemplary embodiment of the present disclosure.

FIG. 3 is a schematic view illustrating a recurrent neural network according to an exemplary embodiment of the present disclosure.

FIG. 4 conceptually illustrates that a processor generates weather data using executable components stored in a memory according to an exemplary embodiment of the present disclosure.

FIG. 5 conceptually illustrates observation data according to an exemplary embodiment of the present disclosure.

FIG. 6 is a flowchart illustrating a process in which a processor generates weather data using executable components stored in a memory according to an exemplary embodiment of the present disclosure.

FIG. 7 is a simple and normal schematic view of an exemplary computing environment in which the exemplary embodiments of the present disclosure may be implemented.

BEST MODE

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for generating region information of at least one object included in observation data according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 120 and a network unit (not illustrated).

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 120 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 120 may store any type of information generated or determined by the processor 110 and any type of information received by the network unit.

According to an exemplary embodiment of the present disclosure, the memory 120 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 120 on the Internet. The description of the memory is just an example and the present disclosure is not limited thereto.

The network unit according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit may be configured regardless of communication modes such as wired and wireless modes and constituted by various communication networks including a personal area network (PAN), a wide area network (WAN), and the like. Further, the network may be known World Wide Web (WWW) and may adopt a wireless transmission technology used for short-distance communication, such as infrared data association (IrDA) or Bluetooth.

The network unit according to an exemplary embodiment of the present disclosure may use an arbitrary type known wired/wireless communication systems.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

FIG. 3 is a schematic view illustrating a recurrent neural network according to an exemplary embodiment of the present disclosure.

As illustrated in FIG. 3, in the present disclosure, a network function may have a recurrent neural network (RNN) type in addition to a type of a general artificial neural network. The recurrent neural network has a characteristic that a connection between units has a recurrent structure. Such a structure makes it possible to store a state in a neural network so as to model a time-varying dynamic feature. Unlike a forward delivery neural network, the recurrent neural network may process a sequence type input by using an internal memory. Accordingly, the recurrent neural network may process data having a time-varying feature such as handwriting recognition, speech recognition. The description of the aforementioned data is just an example and the present disclosure is not limited thereto.

Input data according to the present disclosure is data input to a neural network. In particular, when the neural network is the recurrent neural network, the input data may be the value of a weather factor at a time point before the current time of the detailed region of initial ground weather observation data 400 and data for metadata Output data according to the present disclosure is a result of the input data derived through the network function, and may be a value of a weather factor at the current time of the detailed region of the initial ground weather observation data 400 derived by the network function at the current time.

The recurrent neural network structure according to the present disclosure may be constructed using an auto-regressive model in which the result of the previous time becomes part of the input data of the next time.

However, since the above-described input data and output data are only examples, the types of input data and output data are not limited thereto.

FIG. 4 conceptually illustrates that a processor generates weather data using executable components stored in a memory according to an exemplary embodiment of the present disclosure.

As schematically illustrated in FIG. 4, the processor 110 according to the present disclosure inputs initial ground weather observation data 400, satellite weather observation data 500, and/or land surface type data and land surface characteristic data 600 into a weather data generating component 200 to generate weather data 700.

Although not illustrated in FIG. 4, an initial ground weather observation data recognition component according to the present disclosure recognizes observation data of weather factors on a land surface and processes the observation data of the weather factors on the observed land surface, thereby generate the initial ground weather observation data 400.

The weather data generating component 200 according to the present disclosure receives the recognized initial ground weather observation data 400, satellite weather observation data 500, and land surface characteristics and land surface type data 600 as an input to generate weather data 700 in which a missing region on the initial ground weather observation data 400 is filled.

Specifically, in an exemplary embodiment according to the present disclosure, the processor 110 recognizes the initial ground weather observation data observed by the initial ground weather observation data recognition component, and uses the weather data generation component 200 trained to generate the weather data of the gap region on the initial ground weather observation data by using a machine learning module to generate the weather data 700 based on the initial ground weather observation data 400, the satellite weather observation data 500, and the land surface characteristic data and land surface type data 600. Furthermore, the computing device 100 may additionally include a weather data high-resolution production component that performs a high-resolution production task for the weather data generated by the weather data generation component 200. The weather data high-resolution production component may create the weather data 700 with high resolution based on a super-resolution technique.

Various data input into the weather data generation component 200, the weather data high-resolution production component, and the weather data generation component will be described below.

In the present disclosure, the initial ground weather observation data 400 may be a set of weather factors observed at one or more observation points which are present on the land surface. Here, the weather factor may mean one or more data which may represent the weather at the observation point, and mean, for example, temperature, humidity, wind direction, wind speed, and the like at the observation point. In general, a range of a region where the weather factors are observed on the land surface is determined by a location of the observation point and an observation radius of an observation instrument. That is, the weather factor on the land surface is observed only for the weather factor in the radius of the observation instrument from the observation point. Therefore, the weather factor on the land surface may be observed only for a part of the observation region of the weather data generated by the computing device according to the present disclosure.

For example, the initial ground weather observation data recognition component may divide an entire observation region of the weather data into a plurality of detailed regions. The initial ground weather observation data recognition component may generate the initial ground weather observation data 400 by making the recognized observation data of the weather factor on the on the land surface correspond to the plurality of detailed regions. As a result, the generated initial ground weather observation data 400 may have a data expression format similar to a 2D or 3D image or matrix.

An observation error may be present in the initial ground weather observation data 400. Therefore, a value of the weather factor included in the initial ground weather observation data 400 may be different from a true value and an observation value in the observation region. In an exemplary embodiment, a value of a weather factor corresponding to one detailed region of the initial ground weather observation data 400 may be determined by the observation value of the corresponding detailed region, and the observation error. Specifically, the value of the weather factor corresponding to one detailed region of the initial ground weather observation data 400 is an observation value, an adjustment value which decreases from the observation value by a random value within an observation error range, or a value extracted from a model of a probability distribution in which the true value will be present within the observation error range from the observation value. In an exemplary embodiment, the probability distribution may be a Gaussian distribution. In an exemplary embodiment, the value of the weather factor corresponding to one detailed region of the initial ground weather observation data 400 may be determined by the Gaussian distribution modeled within the observation error range.

The processor 110 may use an observation error of the initial ground weather observation data in order to generate training data for training the ground weather data generation component 200. Specifically, the processor 110 may generate the training data (specifically, non-missing ground weather observation data) by modeling a distribution of the initial ground weather observation data within the observation error. In this case, the distribution of the initial ground weather observation data may follow the Gaussian distribution. In this case, the non-missing ground weather observation data may be generated by a non-missing ground weather observation data generation component. The non-missing ground weather observation data generation component and a method for generating non-missing ground weather observation data will be described below in detail.

The weather data generation component 200 according to the present disclosure may use the satellite weather observation data 500 in order to generate the weather data 700. The satellite weather observation data may observe weather factors for a relatively wider region than the initial ground weather observation data 400. The weather factors included in the satellite weather observation data 500 according to the present disclosure may be the same as those of the initial ground weather observation data 400. Alternatively, the satellite weather observation data 500 may contain different types of weather factors than the initial ground weather observation data 400.

For example, the initial ground weather observation data 400 may include the temperature, the humidity, the wind speed, the wind direction, etc., of the detailed region measured on the land surface. In this case, the satellite weather observation data 500 may include a radiation amount, a brightness temperature, atmospheric variables (an atmospheric motion vector, an upper atmospheric layer, a middle layer, a lower layer water vapor amount, etc.), etc of the corresponding detailed region. Furthermore, the satellite weather observation data 500 may indicate the thickness of clouds, movement of clouds, information on an air mass, etc., in the sky of the corresponding detailed region.

The satellite weather observation data 500 may be used as a direct operation factor in generating the weather data for the observation gap region. Alternatively, the satellite weather observation data 500 for generating the weather data for the observation gap region may be used as one factor of training data for training the weather data generation component 200. Detailed contents thereof will be described below.

The land surface characteristic data and land surface type data 600 may be data regarding the land surface within the observation region of the initial ground weather observation data 400. For example, the land surface characteristic data and land surface type data 600 may include information on an elevation and a slope of a detailed region within the observation region, whether the corresponding detailed region is a pasture, whether the corresponding detailed region is a mountain detrain, and the like. The land surface characteristic data and land surface type data 600 may be factors which directly/indirectly affect weather conditions of the corresponding detailed region, weather change information, weather change patterns, and the like. Therefore, the weather data generation component 200 may be a factor to be considered in generating the weather data 700. That is, the land surface characteristic data and land surface type data may be included in input data of the weather data generation component 200. The land surface characteristic data and land surface type data 600 may be used for generating the weather data by using a predetermined logic defining a relationship between the characteristics and the type of the land surface and the weather factor within the weather data generation component 200. Alternatively, the machine learning module may be included as one type of metadata for the weather factor of the corresponding detailed region within the weather data generation component 200, and used for generating the weather data 700.

In the present disclosure, the weather data generating component 200 may be modules for generating the weather data 700 by using the initial ground weather observation data 400, the satellite weather observation data 500, and the land surface characteristics data and land surface type data 600. The weather data generating component 200 may be a computer program module which may be stored in the memory 120 and executed by the processor 110.

In some exemplary embodiments of the present disclosure, the weather data generation component 200 may generate weather data for the gap region by using the predetermined logic based on a rule. For example, the weather data generation component 200 may generate the weather data for the gap region by using a relational expression or an equation that expresses at least two relationships of a surrounding weather factor of a current time, a weather factor of the gap region of a previous time, and the satellite weather observation data 500 or the land surface characteristic data and land surface type data 600 of the corresponding region.

Alternatively, the weather data generation component 200 may be a machine learning module trained to generate the weather data for the weather factor observation gap region. Specifically, the weather data generation component 200 may be a machine learning module generating the weather data for the gap region by using an inpainting technique using deep learning. Specifically, the weather data generation component 200 may be constructed by using at least one various machine learning model based on a CNN and a GAN, a rule based model, an auto-encoder, a generative model, and a module (e.g., PConv, or McGAN) for performing inpainting using the deep learning. The weather data generation component 200 may use the satellite weather observation data 500 and the land surface characteristic data and land surface type data 600 as a part of a latent feature for generating the weather data. Furthermore, the weather data generation component 200 may use a model based on a recurrent neural network in order to consider a time-series feature of the weather factor, for example, a seasonal factor, an influence of the weather factor of the previous time, etc. When the weather data generation component 200 is based on the recurrent neural network, the weather data generation component 200 may also be configured so that a derivation result of the previous time of the recurrent neural network is included as a part input data at the time of generating the weather factor of the current time. On the contrary, the weather data generation component 200 may also allow to only the configuration of the recurrent neural network to be used for generating the weather factor at the current time except for the derivation result of the previous time. Detailed contents thereof will be described below.

The weather data generation component 200 may be trained using non-missing ground weather observation data. When the weather data generation component 200 uses the rule-based predetermined logic, the weather data generation component 200 may be constituted by a model that obtains one or more data for a partial region of the initial ground weather observation data in which there is no observation gap, and then uses the obtained weather data for one or more partial regions. In this case, in addition to the weather data, the aforementioned satellite weather observation data 500, the land surface characteristic data and land surface type data 600 may be additionally used. As an example, such a modeling technique may be a statistical regression equation, and in this case, the predetermined logic of the weather data generating component 200 may be expressed as a relational expression (or regression equation) between one or more data of the weather factor of the gap region, the satellite weather observation data 500, the land surface characteristic data and land surface type data 600, and additional metadata, and coefficients of the relational expression may be statistically extracted.

Another exemplary embodiment, when the weather data generation component 200 is a machine learning module trained to generate the weather data for the weather factor observation gap region, the weather data generation component may be trained by using the non-missing ground weather observation data 410 and artificial missing ground weather observation data generated based on the non-missing ground weather observation data. Specifically, the weather data generation component 200 may generate the artificial missing ground weather observation data by creating the missing region corresponding to the observation gap region of the weather factor with respect to the non-missing ground weather observation data 410. The weather data generation component 200 may be trained to generate the non-missing ground weather observation data 410 by receiving the artificial missing ground weather observation data as an input. In this case, the weather data generation component 200 may be trained to generate the non-missing ground weather observation data 410 by reflecting information included in the metadata by additionally receiving the metadata in addition to the artificial missing ground weather observation data as an input. The metadata may include the land surface characteristic data and land surface type data 600 and the satellite weather observation data 500, but is not limited thereto.

According to the present disclosure, components which are executable by the processor 110 may include a weather data high-resolution production component (not illustrated) that performs a high-resolution production task for the weather data generated by the weather data generation component. The weather data high-resolution production component may be performed by using a single image super resolution (SISR) technique, a multi image super resolution (MISR) technique, or a deep learning based SRCNN technique. When the weather data high-resolution production component is used, the weather data 700 including more subsided weather factor values for the gap region may be generated.

In the present disclosure, the weather data 700 may mean data generated by the weather data generation component 200 without the missing region for an observation target region.

FIG. 5 conceptually illustrates observation data according to an exemplary embodiment of the present disclosure.

As described above in FIG. 4, in the present disclosure, the initial ground weather observation data 400 may be the set of the weather factors observed at one or more observation points which are present on the land surface. Here, the weather factor may mean one or more data which may represent the weather at the observation point, and mean, for example, temperature, humidity, wind direction, wind speed, and the like at the observation point. In general, a range of a region where the weather factors are observed on the land surface is determined by a location of the observation point and an observation radius of an observation instrument. That is, the weather factor on the land surface is observed only for the weather factor in the radius of the observation instrument from the observation point. Therefore, the weather factor on the land surface may be observed only for a part of the observation region of the weather data generated by the computing device according to the present disclosure.

For example, the initial ground weather observation data recognition component may divide an entire observation region of the weather data into a plurality of detailed regions. The initial ground weather observation data recognition component may generate the initial ground weather observation data 400 by making the recognized observation data of the weather factor on the on the land surface correspond to the plurality of detailed regions. As a result, the generated initial ground weather observation data 400 may have a data expression format similar to a 2D or 3D image or matrix.

An observation error may be present in the initial ground weather observation data 400. Therefore, a value of the weather factor included in the initial ground weather observation data 400 may be different from a true value and an observation value in the observation region. In an exemplary embodiment, a value of a weather factor corresponding to one detailed region of the initial ground weather observation data 400 may be determined by the observation value of the corresponding detailed region, and the observation error. Specifically, the value of the weather factor corresponding to one detailed region of the initial ground weather observation data 400 is an observation value, an adjustment value which decreases from the observation value by a random value within an observation error range, or a value extracted from a model of a probability distribution in which the true value will be present within the observation error range from the observation value. In an exemplary embodiment, the probability distribution may be a Gaussian distribution. In an exemplary embodiment, the value of the weather factor corresponding to one detailed region of the initial ground weather observation data 400 may be determined by the Gaussian distribution modeled within the observation error range. The processor 110 may use an observation error of the initial ground weather observation data in order to generate training data for training the ground weather data generation component 200, and this will be described below.

Now, referring to FIG. 5, the initial ground weather observation data 400 may be divided into one or more detailed regions. The initial ground weather observation data 400 may be a set of weather factor (e.g., the temperature, the humidity, the wind speed, the wind direction, etc.) data of one or more divided detailed regions. Each of the detailed regions acquired by dividing the initial ground weather observation data 400 may be divided into the non-missing ground weather observation data 410 and the missing region 420. The above-described contents are just an example of the initial ground weather observation data 400, so a range of the initial ground weather observation data 400 is not limited thereto.

The contents will be described with reference to FIG. 5. The non-missing ground weather observation data 410 may be defined as ground weather observation data for a detailed region which missing for the weather factor is not present among the observation data for a plurality of detailed regions acquired by dividing the initial ground weather observation data 400. A size of the non-missing ground weather observation data 410 may be determined according to a range of an observation region of an observation instrument which is present on the land surface. For example, when the range of the observation region of the observation instrument which is present on the land surface is 5 km, the weather factor data may be present for a radius of 5 km from the observation instrument. Accordingly, in this case, the size of the non-missing ground weather observation data 410 may be defined by the radius of 5 km. Alternatively, the non-missing ground weather observation data 410 may also be acquired by dividing the weather data of the region observed by the observation instrument into the detailed region again. Specifically, the non-missing ground weather observation data may be generated based on at least a part of a region in which the observation data is present among the initial ground weather observation data.

Alternatively, the non-missing ground weather observation data 410 may be reconfigured based on the observation data for the plurality of detailed regions acquired by dividing the initial ground weather observation data 400. For example, the non-missing ground weather observation data 410 may be the weather factor data for the detailed region reconfigured by the relational expression between the weather factor data for the detailed region of the initial ground weather observation data 400 and one or more metadata. Alternatively, when the satellite weather observation data 500 has a weather factor observation value for the missing region 420, the non-missing ground weather observation data 410 may be generated by applying the observation data of the satellite weather observation data for the observation data missing region of the initial ground weather observation data 400. Alternatively, the non-missing ground weather observation data 410 may be reconfigured by using an observation error of the observation instrument positioned on the land surface. When the non-missing ground weather observation data 410 is reconfigured as described above, one or more non-missing ground weather observation data 410 may be generated for one detailed region. In this case, it is possible to amplify training data for training of the weather data generation component 200. That is, two or more (a plurality of) non-missing ground weather observation data 410 may be generated from one initial ground weather observation data. Therefore, the weather data generation component 200 may be better trained.

Specifically, in the relational expression for generating the non-missing ground weather observation data 410, the relational expression between the weather factor data for the detailed region and one or more metadata may be a regression equation based on a statistical technique. That is, the non-missing ground weather observation data 410 may be generated by applying missing region weather estimation data generated by using relational data describing at least one of the relationship between the satellite weather observation data 500 for the missing region 420, or the land surface characteristic data or land surface type data 600.

The non-missing ground weather observation data 410 may be reconfigured by using the observation error of the observation instrument. For example, in the non-missing ground weather observation data 410, the value of the weather factor to be included in the corresponding detailed region may be determined based on the observation value of the weather factor within the initial ground weather observation data observed in the corresponding detailed region, and a model based on the observation error. That is, the non-missing ground weather observation data may be generated by modeling the distribution of the initial ground weather observation data within the observation error. For example, the model may be a probability distribution based on the observation value and the observation error, and in this case, a probability model may be a Gaussian distribution. For example, in this case, the probability model may follow the Gaussian distribution having the observation value of the weather factor for the detailed region as a mean. In this case, the value of the weather factor should be reconfigured only within the observation error range. In this case, the non-missing ground weather observation data 410 may be generated by a generative model using a model based on the observation value of the weather factor observed in the corresponding detailed region, and the observation error.

That is, the computing device 100 generating the weather observation data according to the present disclosure may include the non-missing ground weather observation data generation component for generating the non-missing ground weather observation data in the memory 120. The non-missing weather data generation component may generate the non-missing ground weather observation data by the above-described method. In order to generate the non-missing ground weather observation data by the above-described method, the non-missing ground weather observation data generation component may be constructed by using the machine learning based generative model. The non-missing weather data generation component may use one or more first-time non-missing ground weather observation data for generating second-time missing ground observation data. In this case, the non-missing weather data generation component may be a recurrent neural network (RNN) based machine learning model. Since the weather situation is greatly influenced by the weather condition at a previous time, if values of weather factors at various previous times are considered at the time of generating the weather data by the above description, the weather data for the missing region 420 may be more accurately generated.

By the above-described method, it is possible to amplify the training data for training of the weather data generation component 200. That is, two or more (a plurality of) non-missing ground weather observation data 410 may be generated from one initial ground weather observation data. Therefore, the weather data generation component 200 may be better trained.

The weather data generation component 200 may additionally consider a time-series factor for generating the value of the weather factor for the missing region 420. As an example, the weather data generation component 200 may use the values of one or more weather factors at the previous time for generating the value of the weather factor at the current time. Specifically, the weather data generation component 200 may use one or more first-time non-missing ground observation data for generating the second-time missing ground observation data. In the present disclosure, the missing region may include a missing region. Here, the missing region may originally mean a region in which the observation value is included in the ground weather observation data, but a region in which the observation value is not present. In this case, the first-time non-missing ground observation data may be weather data before the second time for the missing region. Alternatively, the first-time non-missing ground observation data may be weather data before the second time for the missing region. That is, the weather data generation component 200 may generate the value of the weather factor of the missing region at the second time by using the weather observation value included in one or more non-missing ground observation data at the first time. Alternatively, the weather data generation component 200 may generate the value of the weather factor of the missing region at the second time by using the observation value of the weather factor included in one or more non-missing ground observation data at the first time. In this case, the weather data generation component 200 may be the recurrent neural network (RNN) based machine learning model. Since the weather situation is greatly influenced by the weather condition at a previous time, if values of weather factors at various precious times are considered at the time of generating the weather data by the above description, the weather data for the missing region 420 may be more accurately generated.

The above-described training data additionally includes various weather related metadata to allow the weather data generation component 200 to consider various aspects at the time of generating the weather data for the missing region 420. An example of the metadata may include the satellite weather observation data 500, and the land surface characteristic data and land surface type data 600. The above-described example is just an example of the metadata for generating the weather data, and the type of metadata is not limited thereto.

The processor 110 may artificially generate the missing region in the generated non-missing ground weather observation data 410 in order to train the weather data generation component 200. As described above, the weather data generation component 200 may be trained to generate the weather data 700 close to the non-missing ground weather observation data 410 from the artificial missing ground observation data. That is, a loss function for training the weather data generation component 200 may compare the weather data 700 generated from the artificial missing ground observation data and the non-missing ground weather observation data 410.

The weather data generation component 200 trained as described above may be constructed by using at least one various machine learning modules based on a CNN and a GAN, a rule based model, an auto-encoder, a generative model, and a module (e.g., PConv, or McGAN) for performing inpainting using the deep learning. The weather data generation component 200 may use the satellite weather observation data 500 and the land surface characteristic data and land surface type data 600 as a part of a latent feature for generating the weather data.

Referring to FIG. 5, the missing region 420 may be a region in which the value of the weather factor is not measured by the observation instrument on the land surface among the initial ground weather observation data 400. In the present disclosure, the missing region may include a missing region. Here, the missing region may originally mean a region in which the observation value is included in the ground weather observation data, but a region in which the observation value is not present as described above. Since the missing region 420 is not influenced by ground observation, the ground observation may be continuously missed in the corresponding region. However, since the satellite weather observation data 500 and the land surface characteristic data and land surface type data 600 may be present even with respect to the missing region 420, the weather data generation component 200 may generate the weather data for the missing region 420 based on the satellite weather observation data 500 and the land surface characteristic data and land surface type data 600.

FIG. 6 is a flowchart illustrating a process in which a processor generates weather data using executable components stored in a memory according to an exemplary embodiment of the present disclosure.

The processor 110 may recognize observed initial ground weather observation data (S100).

An initial ground weather observation data recognition component according to the present disclosure recognizes observation data of weather factors on a land surface and processes the observation data of the weather factors on the observed land surface, thereby generating the initial ground weather observation data 400.

In the present disclosure, the initial ground weather observation data 400 may be a set of weather factors observed at one or more observation points which are present on the land surface. Here, the weather factor may mean one or more data which may represent the weather at the observation point, and mean, for example, temperature, humidity, wind direction, wind speed, and the like at the observation point. In general, a range of a region where the weather factors are observed on the land surface is determined by a location of the observation point and an observation radius of an observation instrument. That is, the weather factor on the land surface is observed only for the weather factor in the radius of the observation instrument from the observation point. Therefore, the weather factor on the land surface may be observed only for a part of the observation region of the weather data generated by the computing device according to the present disclosure.

For example, the initial ground weather observation data recognition component may divide an entire observation region of the weather data into a plurality of detailed regions. The initial ground weather observation data recognition component may generate the initial ground weather observation data 400 by making the recognized observation data of the weather factor on the land surface correspond to the plurality of detailed regions. As a result, the generated initial ground weather observation data 400 may have a data expression format similar to a 2D or 3D image or matrix.

An observation error may be present in the initial ground weather observation data 400. Therefore, a value of the weather factor included in the initial ground weather observation data 400 may be different from a true value and an observation value in the observation region. In an exemplary embodiment, a value of a weather factor corresponding to one detailed region of the initial ground weather observation data 400 may be determined by the observation value of the corresponding detailed region, and the observation error. Specifically, the value of the weather factor corresponding to one detailed region of the initial ground weather observation data 400 is an observation value, an adjustment value which decreases from the observation value by a random value within an observation error range, or a value extracted from a model of a probability distribution in which the true value will be present within the observation error range from the observation value. In an exemplary embodiment, the probability distribution may be a Gaussian distribution. In an exemplary embodiment, the value of the weather factor corresponding to one detailed region of the initial ground weather observation data 400 may be determined by the Gaussian distribution modeled within the observation error range. The processor 110 may use an observation error of the initial ground weather observation data in order to generate training data for training the ground weather data generation component 200, and this will be described below.

The weather data generation component 200 according to the present disclosure may use the satellite weather observation data 500 in order to generate the weather data 700. The satellite weather observation data may observe weather factors for a relatively wider region than the initial ground weather observation data 400. The weather factors included in the satellite weather observation data 500 according to the present disclosure may be the same as those of the initial ground weather observation data 400. Alternatively, the satellite weather observation data 500 may contain different types of weather factors than the initial ground weather observation data 400.

For example, the initial ground weather observation data 400 may include the temperature, the humidity, the wind speed, the wind direction, etc., of the detailed region measured on the land surface. In this case, the satellite weather observation data 500 may include a radiation amount, a brightness temperature, atmospheric variables (an atmospheric motion vector, an upper atmospheric layer, a middle layer, a lower layer water vapor amount, etc.), etc., of the corresponding detailed region. Furthermore, the satellite weather observation data 500 may indicate the thickness of clouds, movement of clouds, information on an air mass, etc., in the sky of the corresponding detailed region.

The satellite weather observation data 500 may be used as a direct operation factor in generating the weather data for the observation gap region. Alternatively, the satellite weather observation data 500 may be used as one factor of training data for training the weather data generation component 200 for generating the weather data for the observation gap region. Detailed contents thereof will be described below.

The land surface characteristic data and land surface type data 600 may be data regarding the land surface within the observation region of the initial ground weather observation data 400. For example, the land surface characteristic data and land surface type data 600 may include information on an elevation and a slope of a detailed region within the observation region, whether the corresponding detailed region is a pasture, whether the corresponding detailed region is a mountain detrain, and the like. The land surface characteristic data and land surface type data 600 may be factors which directly/indirectly affect weather conditions of the corresponding detailed region, weather change information, weather change patterns, and the like. Therefore, the weather data generation component 200 may be a factor to be considered in generating the weather data 700. That is, the land surface characteristic data and land surface type data may be included in input data of the weather data generation component 200. The land surface characteristic data and land surface type data 600 may be used for generating the weather data by using a predetermined logic defining a relationship between the characteristics and the type of the land surface and the weather factor within the weather data generation component 200. Alternatively, the machine learning module may be included as one type of metadata for the weather factor of the corresponding detailed region within the weather data generation component 200, and used for generating the weather data 700 considering land surface characteristics or a land surface type.

The processor 110 may generate weather data of a gap region on initial ground weather observation data by using a machine learning module (S200).

The weather data generating component 200 according to the present disclosure receives the recognized initial ground weather observation data 400, satellite weather observation data 500, and land surface characteristics data and land surface type data 600 as an input to generate weather data 700 in which a missing region on the initial ground weather observation data 400 is filled.

Specifically, in an exemplary embodiment according to the present disclosure, the processor 110 recognizes the initial ground weather observation data observed by the initial ground weather observation data recognition component, and uses the weather data generation component trained to generate the weather data of the gap region on the initial ground weather observation data by using a machine learning module to generate the weather data 700 based on the initial ground weather observation data 400, the satellite weather observation data 500, and the land surface characteristics data and land surface type data 600. Furthermore, the computing device 100 may additionally include a weather data high-resolution production component that performs a high-resolution production task for the weather data generated by the weather data generation component 200. The weather data high-resolution production component may create the weather data 700 with high resolution based on a super-resolution technique.

In the present disclosure, the weather data generating component 200 may be modules for generating the weather data 700 by using the initial ground weather observation data 400, the satellite weather observation data 500, and the land surface characteristics data and land surface type data 600. The weather data generating component 200 may be a computer program module which may be stored in the memory 120 and executed by the processor 110.

In some exemplary embodiments of the present disclosure, the weather data generation component 200 may generate weather data for the gap region by using the predetermined logic based on a rule. For example, the weather data generation component 200 may generate the weather data for the gap region by using a relational expression or an equation that expresses at least two relationships of a surrounding weather factor of a current time, a weather factor of the gap region of a previous time, and the satellite weather observation data 500 or the land surface characteristic data and land surface type data 600 of the corresponding region.

Alternatively, the weather data generation component 200 may be a machine learning module trained to generate the weather data for the weather factor observation gap region. Specifically, the weather data generation component 200 may be a machine learning module generating the weather data for the gap region by using an inpainting technique using deep learning. Specifically, the weather data generation component 200 may be the auto-encoder, the generative model, etc. Specifically, the weather data generation component 200 may be constructed by using at least one various machine learning modules based on a CNN and a GAN, a rule based model, an auto-encoder, a generative module, and a module (e.g., PConv, or McGAN) for performing inpainting using the deep learning. The weather data generation component 200 may use the satellite weather observation data 500 and the land surface characteristic data and land surface type data 600 as a part of a latent feature for generating the weather data. Furthermore, the weather data generation component 200 may use a model based on a recurrent neural network in order to consider a time-series feature of the weather factor, for example, a seasonal factor, an influence of the weather factor of the previous time, etc. When the weather data generation component 200 is based on the recurrent neural network, the weather data generation component 200 may also be configured so that a derivation result of the previous time of the recurrent neural network is included as a part input data at the time of generating the weather factor of the current time. On the contrary, the weather data generation component 200 may also allow to only the configuration of the recurrent neural network to be used for generating the weather factor at the current time except for the derivation result of the previous time.

The weather data generation component 200 may be trained using non-missing ground weather observation data. When the weather data generation component 200 uses the rule-based predetermined logic, the weather data generation component 200 may be modeled by obtaining one or more data for a partial region of the initial ground weather observation data in which there is no observation gap, and then using the obtained weather data for one or more partial regions. In this case, in addition to the weather data, the aforementioned satellite weather observation data 500, the land surface characteristic data and land surface type data 600 may be additionally used. As an example, such a modeling technique may be a statistical regression equation, and in this case, the predetermined logic of the weather data generating component 200 may be expressed as a relational expression (or regression equation) between one or more data of the weather factor of the gap region, the satellite weather observation data 500, the land surface characteristic data and land surface type data 600, and additional metadata, and coefficients of the relational expression may be statistically extracted.

Another exemplary embodiment, when the weather data generation component 200 is a machine learning module trained to generate the weather data for the weather factor observation gap region, the weather data generation component may be trained by using the non-missing ground weather observation data 410 and the artificial missing ground weather observation data generated based on the non-missing ground weather observation data. Specifically, the weather data generation component 200 may generate the artificial missing ground weather observation data by creating the missing region corresponding to the observation gap region of the weather factor with respect to the non-missing ground weather observation data 410. The weather data generation component 200 may be trained to generate the non-missing ground weather observation data 410 by receiving the artificial missing ground weather observation data as an input. In this case, the weather data generation component 200 may be trained to generate the non-missing ground weather observation data 410 by reflecting information included in the metadata by additionally receiving the metadata in addition to the artificial missing ground weather observation data as an input. The metadata may include the land surface characteristic data and land surface type data 600 and the satellite weather observation data 500, but is not limited thereto.

According to the present disclosure, components which are executable by the processor 110 may include a weather data high-resolution production component (not illustrated) that performs a high-resolution production task for the weather data generated by the weather data generation component. The weather data high-resolution production component may be performed by using a single image super resolution (SISR) technique, a multi image super resolution (MISR) technique, or a deep learning based SRCNN technique. When the weather data high-resolution production component is used, the weather data 700 including more subsided weather factor values for the gap region may be generated.

FIG. 7 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multiprocessor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

MODE FOR INVENTION

Related contents in the best mode for carrying out the present disclosure are described as above.

INDUSTRIAL APPLICABILITY

The present disclosure may be used for implementing an apparatus for generating weather data based on machine learning.

The invention claimed is:
1. A computing device for generating weather observation data, the computing device comprising:

a memory including computer executable components; and a processor executing following computer executable components stored in the memory, wherein the computer executable components include:

an initial ground weather observation data recognition component recognizing observed initial ground weather observation data, a weather data generation component trained to generate weather data of a gap region on the initial ground weather observation data by using a machine learning module, wherein the weather data generation component is a component trained to generate non-missing data based on a plurality of non-missing ground weather observation data and artificial missing ground observation data generated by using the non-missing ground weather observation data by creating a missing region corresponding to the observation gap region, wherein the non-missing ground weather observation data is generated by applying missing region weather estimation data generated by using relational data describing relationship between the satellite weather observation data for the missing region, and at least one of the land surface characteristic data or land surface type data, based on the initial ground weather observation data;

wherein the missing region is a region in which the weather data are not measured among the initial ground weather observation data.

2. The computing device of claim 1, wherein the weather data generation component is a neural network trained to reconfigure a missing region of observation data based on machine learning.

3. The computing device of claim 2, wherein the non-missing ground weather observation data is generated by using at least one of the land surface characteristic data, land surface type data, or satellite weather observation data, based on the initial ground weather observation data.

4. The computing device of claim 3, wherein the non-missing ground weather observation data is generated based on at least a part of a region in which the observation data is present among the initial ground weather observation data.

5. The computing device of claim 3, wherein the non-missing ground weather observation data is generated by using an observation error of the initial ground weather observation data.

6. The computing device of claim 5, wherein the non-missing ground weather observation data is generated by modeling a distribution of the initial ground weather observation data within the observation error.

7. The computing device of claim 6, wherein the initial ground weather observation data follows a Gaussian distribution within an observation error range.

8. The computing device of claim 5, wherein at least two non-missing ground weather observation data are generated for each of the initial ground weather observation data.

9. The computing device of claim 5, wherein the computer executable components further include a non-missing ground weather observation data generation component, and at least one of the non-missing ground weather observation data generation component or the weather data generation component generates one or more non-missing ground weather observation data by using a machine learned based generative model.

10. The computing device of claim 9, wherein the non-missing ground weather observation data generation component uses one or more first-time non-missing ground weather observation data for generating second-time missing ground observation data.

11. The computing device of claim 10, wherein the non-missing ground weather observation data generation component is a recurrent neural network (RNN) based machine learning model.

12. The computing device of claim 1, wherein the weather data generation component uses at least one of the land surface characteristic data or the land surface type data, based on the initial ground weather observation data and satellite weather observation data.

13. The computing device of claim 12, wherein the weather data generation component generates weather data considering land surface characteristics or a land surface type by receiving at least one of the land surface characteristic data or the land surface type data as metadata for the initial ground weather observation data as an input.

14. The computing device of claim 1, wherein the computer executable components further include a weather data high-resolution production component performing a high-resolution production task for the weather data generated by the weather data generation component.

15. A method for generating weather observation data performed by a computing device, the method comprising:

recognizing observed initial ground weather observation data; and generating weather data of a gap region on the initial ground weather observation data by using a machine learning module, wherein the machine learning module is trained to generate non-missing data based on a plurality of non-missing ground weather observation data and artificial missing ground observation data generated by using the non-missing ground weather observation data by creating a missing region corresponding to the observation gap region, wherein the non-missing ground weather observation data is generated by applying missing region weather estimation data generated by using relational data describing relationship between the satellite weather observation data for the missing region, and at least one of the land surface characteristic data or land surface type data, based on the initial ground weather observation data;

wherein the missing region is a region in which the weather data are not measured among the initial ground weather observation data.

16. A computer program stored on a non-transitory computer readable storage medium, wherein the computer program including instructions for causing one or more processors to generate weather observation data, the instructions comprising:

recognizing observed initial ground weather observation data; and generating weather data of a gap region on the initial ground weather observation data by using a machine learning module, wherein the machine learning module is trained to generate non-missing data based on a plurality of non-missing ground weather observation data and artificial missing ground observation data generated by using the non-missing ground weather observation data by creating a missing region corresponding to the observation gap region, wherein the non-missing ground weather observation data is generated by applying missing region weather estimation data generated by using relational data describing relationship between the satellite weather observation data for the missing region, and at least one of the land surface characteristic data or land surface type data, based on the initial ground weather observation data;

wherein the missing region is a region in which the weather data are not measured among the initial ground weather observation data.

\* \* \* \* \*